United States Patent
Sukegawa

(10) Patent No.: US 8,892,917 B2
(45) Date of Patent: Nov. 18, 2014

(54) MEMORY SYSTEM AND MEMORY CHIP

(75) Inventor: Hiroshi Sukegawa, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 704 days.

(21) Appl. No.: 12/364,344

(22) Filed: Feb. 2, 2009

(65) Prior Publication Data

US 2009/0144484 A1 Jun. 4, 2009

Related U.S. Application Data

(63) Continuation of application No. PCT/JP2007/065321, filed on Jul. 31, 2007.

(30) Foreign Application Priority Data

Aug. 2, 2006 (JP) .................................. 2006-211198

(51) Int. Cl.
*G06F 1/26* (2006.01)
*G06F 1/32* (2006.01)

(52) U.S. Cl.
CPC ............ *G06F 1/3237* (2013.01); *G06F 1/3275* (2013.01); *Y02B 60/1225* (2013.01); *G06F 1/3225* (2013.01); *Y02B 60/1221* (2013.01); *Y02B 60/32* (2013.01)
USPC .......................................... 713/320; 713/324

(58) Field of Classification Search
USPC ............. 713/320, 322, 323, 324; 365/189.09, 365/226–269
See application file for complete search history.

(56) References Cited

U.S. PATENT DOCUMENTS

| | | | | |
|---|---|---|---|---|
| 5,487,036 | A | * | 1/1996 | Akaogi et al. ........... 365/189.09 |
| 5,495,453 | A | * | 2/1996 | Wojciechowski et al. ........................ 365/185.18 |
| 5,572,478 | A | * | 11/1996 | Sato et al. ...................... 365/226 |
| 5,615,162 | A | * | 3/1997 | Houston ........................ 365/226 |
| 5,696,729 | A | * | 12/1997 | Kitamura ....................... 365/227 |
| 5,765,002 | A | | 6/1998 | Garner et al. |
| 5,826,092 | A | | 10/1998 | Flannery |
| 5,907,518 | A | * | 5/1999 | Shirley et al. .................. 365/226 |
| 6,091,640 | A | * | 7/2000 | Kawahara et al. ........ 365/185.28 |
| 6,151,262 | A | * | 11/2000 | Haroun et al. ................. 365/227 |
| 6,363,454 | B1 | | 3/2002 | Lakhani et al. |
| 6,404,274 | B1 | * | 6/2002 | Hosono et al. ................ 327/538 |

(Continued)

FOREIGN PATENT DOCUMENTS

| | | |
|---|---|---|
| JP | 5-166370 | 7/1993 |
| JP | 2002-189591 | 7/2002 |

(Continued)

OTHER PUBLICATIONS

Extended European Search Report issued Oct. 15, 2012 in Patent Application No. 07791994.2.

(Continued)

*Primary Examiner* — Khanh Dang
(74) *Attorney, Agent, or Firm* — Oblon, Spivak, McClelland, Maier & Neustadt, L.L.P.

(57) ABSTRACT

A memory system includes a memory which asserts a high-power-consumption operation output when an amount of the power consumption is high in internal operations in respective operations, and a controller which has an interface function between a host and the memory and receives the high-power-consumption operation output. The controller switches an operation mode thereof to a low power consumption mode when the high-power-consumption operation output is asserted.

13 Claims, 12 Drawing Sheets

(56) References Cited

U.S. PATENT DOCUMENTS

| | | | |
|---|---|---|---|
| 6,590,813 B2* | 7/2003 | Shiga | 365/189.09 |
| 6,650,833 B1* | 11/2003 | Oda et al. | 396/89 |
| 6,661,710 B2* | 12/2003 | Kwon | 365/185.24 |
| 7,016,231 B2* | 3/2006 | Kubo | 365/185.18 |
| 7,079,439 B2 | 7/2006 | Cowles et al. | |
| 7,221,610 B2* | 5/2007 | Yamazoe et al. | 365/226 |
| 7,499,339 B2* | 3/2009 | Lin | 365/185.33 |
| 7,542,361 B2* | 6/2009 | Sato | 365/205 |
| 7,940,579 B2* | 5/2011 | Fujiu | 365/189.09 |
| 2003/0039139 A1* | 2/2003 | Akaogi et al. | 365/185.3 |
| 2003/0093702 A1 | 5/2003 | Luo et al. | |
| 2004/0193822 A1 | 9/2004 | Kareenahalli et al. | |
| 2004/0240307 A1 | 12/2004 | Kudo | |
| 2005/0091425 A1 | 4/2005 | Wyatt et al. | |
| 2005/0097377 A1 | 5/2005 | Chou | |
| 2005/0201192 A1 | 9/2005 | Honda | |
| 2005/0276110 A1 | 12/2005 | Sakurai et al. | |
| 2007/0081392 A1* | 4/2007 | Park et al. | 365/185.23 |
| 2007/0109900 A1* | 5/2007 | Sakurai et al. | 365/226 |
| 2010/0157683 A1* | 6/2010 | Nguyen | 365/185.18 |

FOREIGN PATENT DOCUMENTS

| | | |
|---|---|---|
| JP | 2004-287760 | 10/2004 |
| JP | 2005-135368 | 5/2005 |
| JP | 2005-258533 | 9/2005 |
| WO | WO 2005/048264 A1 | 5/2005 |

OTHER PUBLICATIONS

Taiwanese Office Action mailed on Feb. 24, 2012, issued for Taiwanese Patent Application No. 10120186730.

* cited by examiner

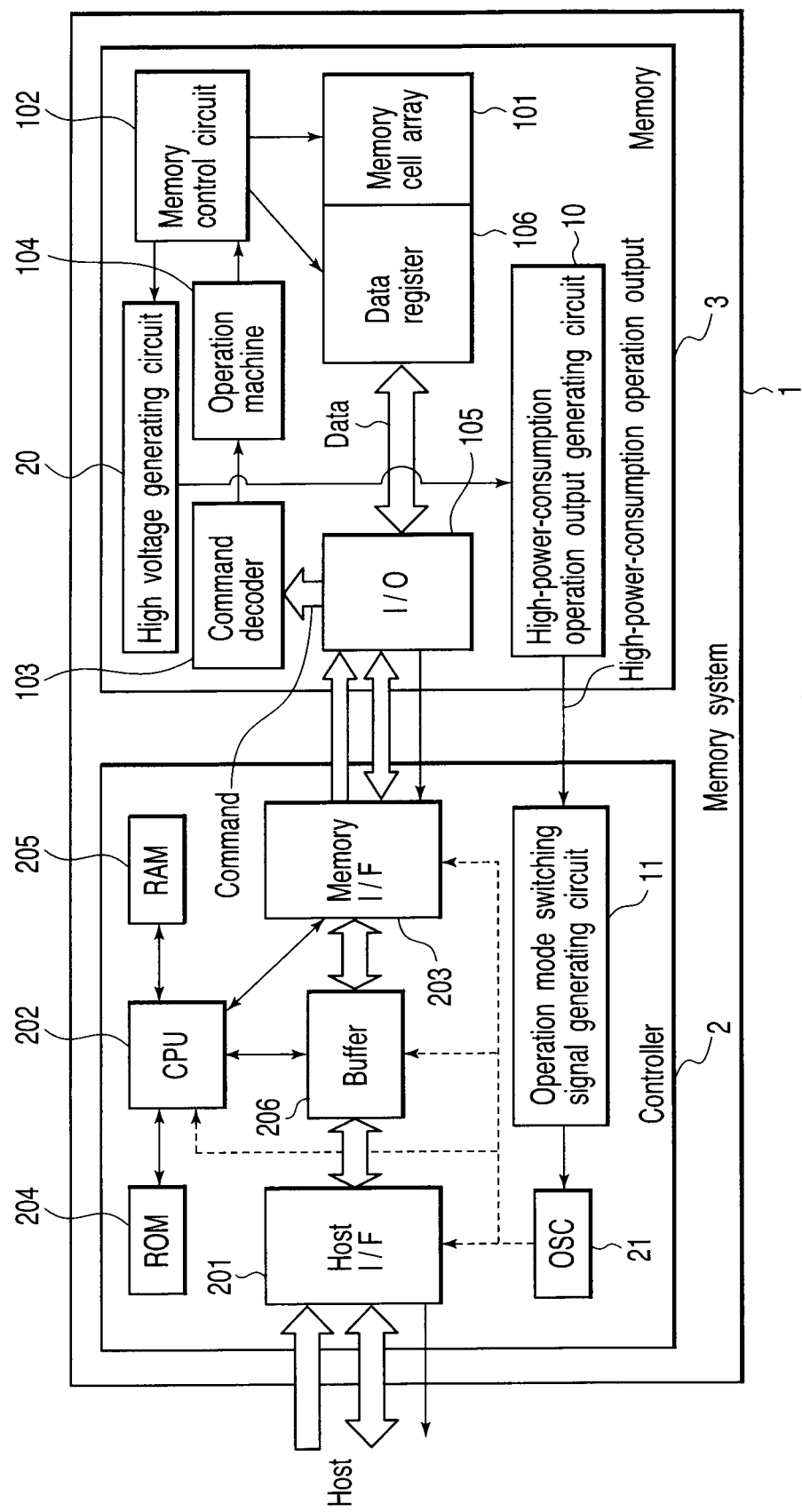
F I G. 5

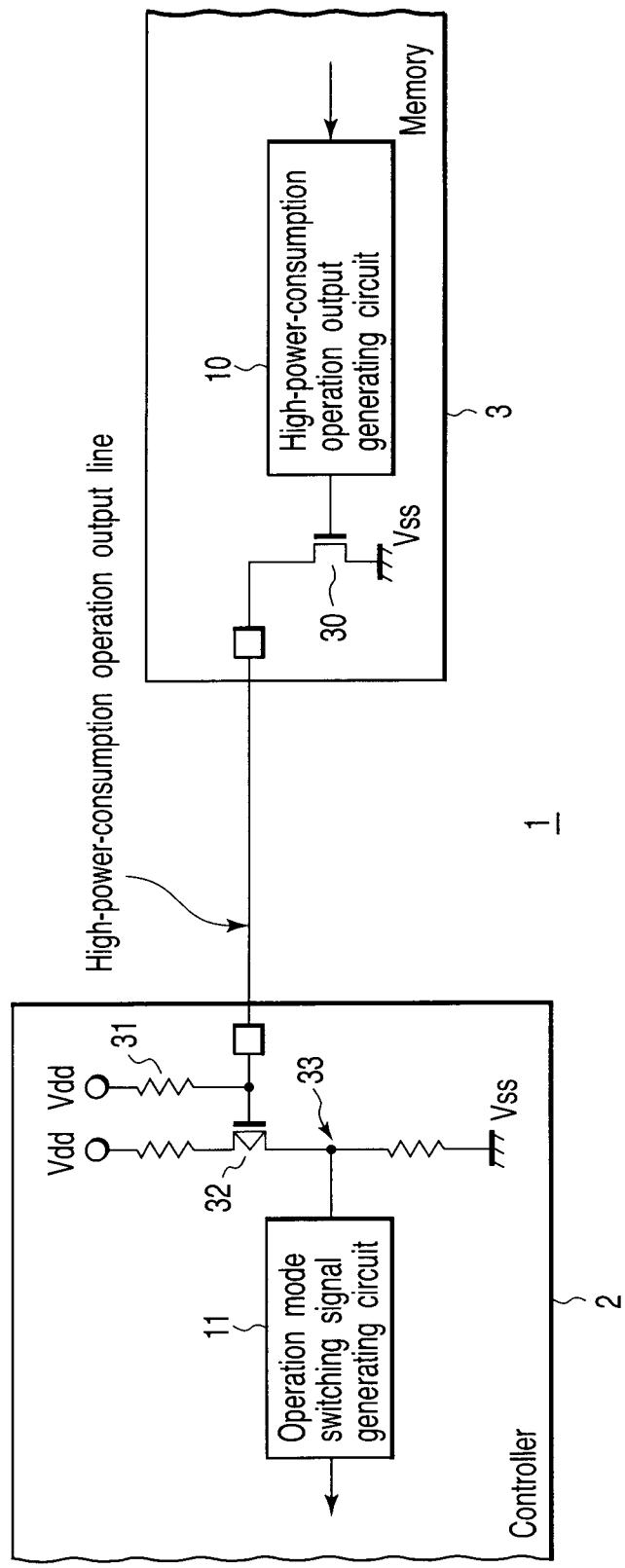
F I G. 9

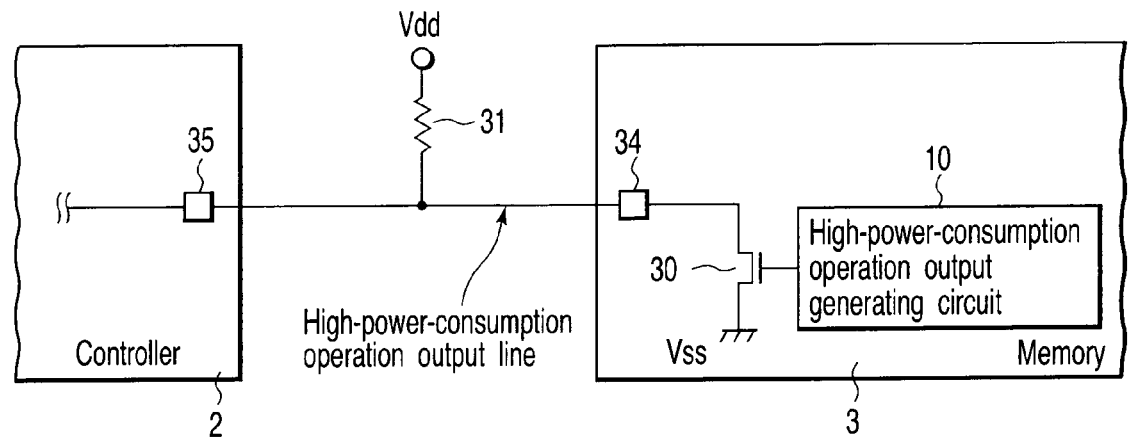
F I G. 1 1
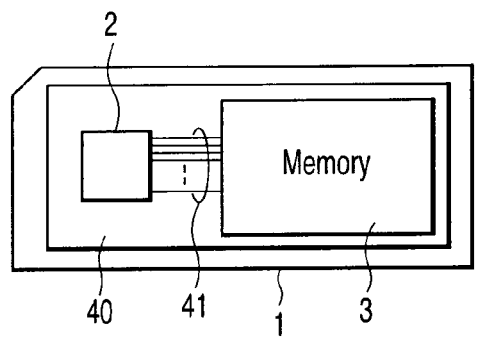
F I G. 1 2
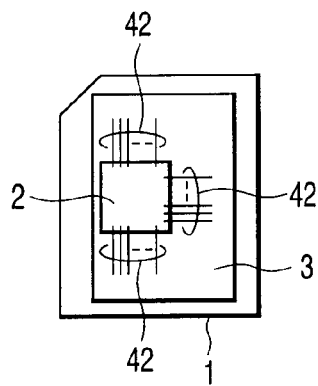
F I G. 1 3

MEMORY SYSTEM AND MEMORY CHIP

CROSS-REFERENCE TO RELATED APPLICATIONS

This is a Continuation application of PCT Application No. PCT/JP2007/065321, filed Jul. 31, 2007, which was published under PCT Article 21(2) in English.

This application is based upon and claims the benefit of priority from prior Japanese Patent Application No. 2006-211198, filed Aug. 2, 2006, the entire contents of which are incorporated herein by reference.

BACKGROUND OF THE INVENTION

1. Field of the Invention

The present invention relates to a memory, such as a flash memory, which executes an internal operation by, e.g. an Auto command, and to a memory system and a memory chip, which include the memory.

2. Description of the Related Art

In the case of a memory, such as a flash memory, which executes an internal operation by an Auto command, a plurality of sequences are executed in series or in parallel in an Auto operation, and the amount of power consumption varies between the sequences which are executed.

A memory system is configured to include a controller which is provided outside a memory chip. The power consumption of the controller also varies between operations. The controller side can recognize the power consumption in each operation of the controller itself, but cannot recognize the power consumption of the memory that is in the Auto operation. Thus, there is a tendency that a peak of large power consumption of the memory system may easily rise.

BRIEF SUMMARY OF THE INVENTION

According to a first aspect of the present invention, there is provided a memory system comprising: a memory which executes operations of write, read and erase, has different power consumptions in accordance with internal operations in the respective operations, and asserts a high-power-consumption operation output when an amount of the power consumption is high in the internal operations in the respective operations; and a controller which has an interface function between a host and the memory and receives the high-power-consumption operation output, the controller switching an operation mode thereof to a low power consumption mode when the high-power-consumption operation output is asserted.

According to a second aspect of the present invention, there is provided a memory chip which executes operations of write, read and erase, and has different power consumptions in accordance with internal operations in the respective operations, internal operations in the respective operations, wherein the memory chip asserts a high-power-consumption operation output when an amount of the power consumption is high in the internal operations in the respective operations.

BRIEF DESCRIPTION OF THE SEVERAL VIEWS OF THE DRAWING

FIG. 5 is a block diagram showing a first example of the memory system according to the first embodiment of the invention;

FIG. 9 is a circuit diagram showing a first example of a memory system according to a second embodiment of the invention;

FIG. 11 is a circuit diagram showing a second example of the memory system according to the second embodiment of the invention;

FIG. 12 is a block diagram showing a first example of connection of a memory system;

FIG. 13 is a block diagram showing a second example of connection of the memory system;

DETAILED DESCRIPTION OF THE INVENTION

Figure 1:
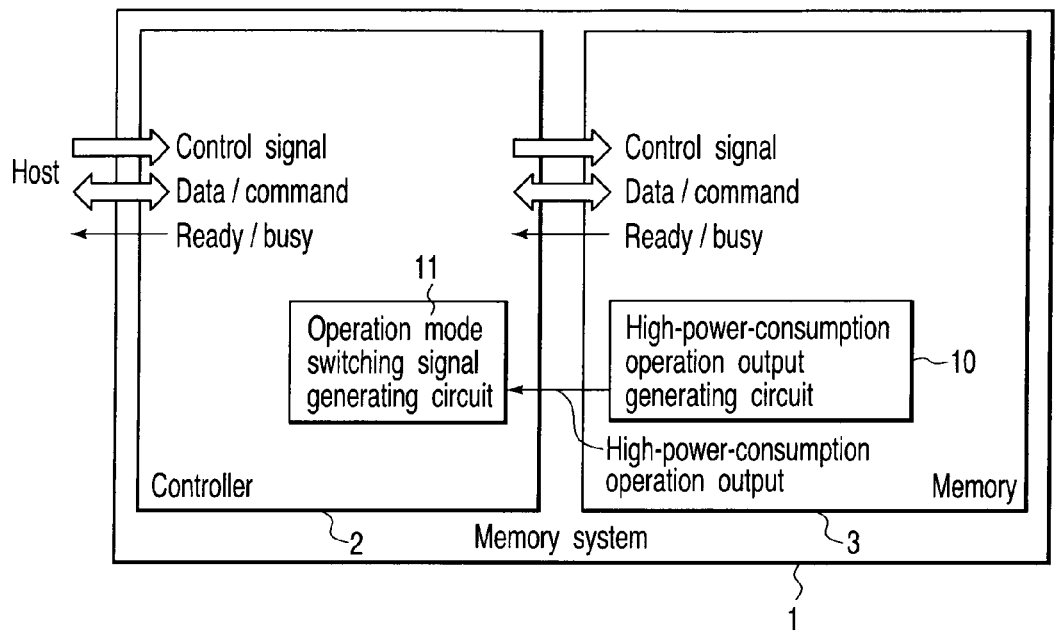
FIG. 1 is a block diagram showing a basic structure of a memory system according to a first embodiment of the present invention.

Embodiments of the present invention will now be described with reference to the accompanying drawings. In the description below, common parts are denoted by common reference numerals throughout the drawings.

First Embodiment

FIG. 1 is a block diagram showing a basic structure of a memory system according to a first embodiment of the present invention.

As shown in FIG. 1, a memory system 1 according to the first embodiment includes a controller 2 and a memory 3 which is controlled by the controller 2. An example of the memory 3 is a nonvolatile semiconductor memory. An example of the nonvolatile semiconductor memory is a flash memory. An example of the flash memory is a NAND flash memory. A specific example of the memory system 1 is a memory card. The memory card is used as a recording medium for, for instance, a digital camera, a mobile phone and a portable music player.

The memory 3 in this embodiment receives a control signal, write data and a command from the controller 2. The memory 3 outputs read data and ready/busy output (RY/BY) to the controller 2. Examples of the control signal are a chip enable /CE ("/" indicates a negative logic), a write enable /WE, a read enable /RE, a command latch enable CLE, an address latch enable ALE, a power-on select PSL, and a write protect /WP. These control signals are input to the memory 3 from the controller 2 via control signal pins. The input of the command, the input of write data and the output of read data are executed via an I/O pin of, e.g. 8 bits or 16 bits. The ready/busy output is sent to the controller 2 from the memory 3 via a ready/busy pin.

The controller 2 in this embodiment has an interface function for interface between a host and the memory 3. As a result, the memory system 1 of this embodiment realizes a passive device function in relation to the host side. The controller 2 receives a control signal, write data and a command from the host. The controller 2 receives the command from the host in accordance with the control signal. The controller 2 controls the memory 3 in accordance with the received command, thereby writing write data, which is sent from the host, in the memory 3, sending read data, which is read out of the memory 3, to the host, and erasing data that is recorded in the memory 3.

In this manner, the memory 3 executes write, read and erase operations under the control of the controller 2.

Furthermore, the memory 3 of this embodiment includes, aside from the above-described function, a high-power-consumption operation output generating circuit 10. The high-power-consumption operation output generating circuit 10 asserts and negates a high-power-consumption operation output to the outside of the memory 3, in accordance with the amount of power consumption of the memory 3 during an internal operation. In the write, read and erase operations, the memory 3 sequentially executes or repeats some internal operations in the respective operations of write, read and erase. For example, in the write operation, examples of the internal operation include input of an address, input of write data, latch of write data in a data register (operations up to this stage are called "first cycle"), precharge of a bit line, write data transfer to the bit line, write pulse application to a word line, verify read, and data re-write in a cell in which predetermined data has not been reached (operations up to this stage are called "auto page program"). These internal operations differ in amount of power consumption. In particular, the precharge of the bit line and the write pulse application to the word line consume a large amount of electric current, and the power consumption in these internal operations tends to be greater than in other internal operations. When the power consumption of the memory 3 reaches a predetermined value or more, or exceeds a predetermined value, the high-power-consumption operation output generating circuit 10 asserts the high-power-consumption operation output. On the other hand, when the power consumption of the memory 3 is less than a predetermined value, or is a predetermined value or less, the high-power-consumption operation output generating circuit 10 negates the high-power-consumption operation output. Thereby, the memory 3 informs the outside of the memory 3 of the amount of power consumption of the memory 3.

The controller 2 of this embodiment has a function of receiving the high-power-consumption operation output, and switches the operation mode of the controller 2 in accordance with the high-power-consumption operation output. An operation mode switching signal generating circuit 11 shown in FIG. 1 generates a switching signal. The controller 2 of this embodiment operates in a normal power consumption mode while the high-power-consumption operation output is being negated. When the high-power-consumption operation output is asserted, the controller 2 of this embodiment switches the operation mode from the normal power consumption mode to a low power consumption mode. While the high-power-consumption operation output is being asserted, the controller 2 operates in the low power consumption mode.

Specific advantageous effects of the memory system 1 according to the first embodiment will now be described.

Figure 2:
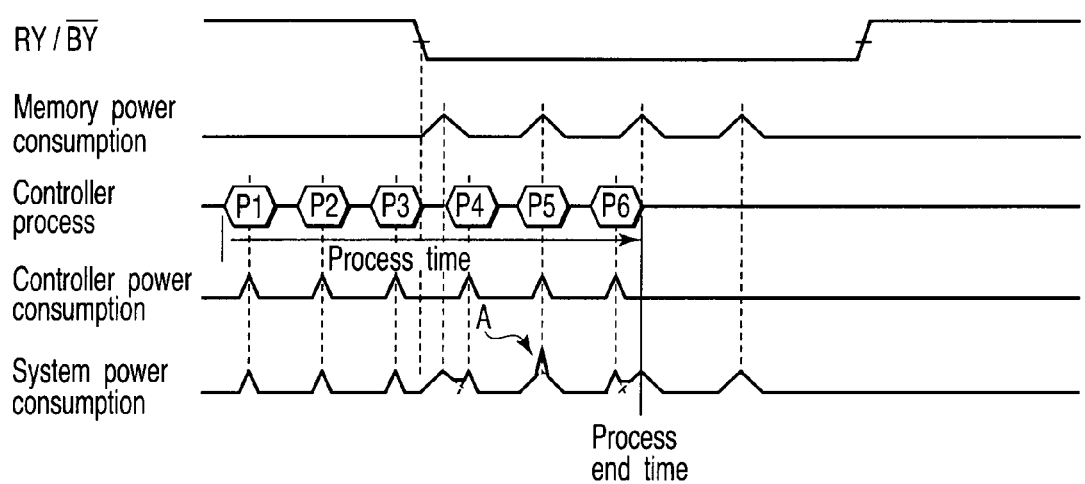
FIG. 2 is a timing chart showing an example of the relationship between a memory system operation and power consumption in a typical example.

FIG. 2 is a timing chart showing an example of the relationship between a memory system operation and a power consumption in a typical example.

As shown in FIG. 2, if the process of the controller overlaps the busy state of the memory, there is a case in which the peak of the memory power consumption overlaps the peak of the controller power consumption. If these peaks overlap, the peak of the system power consumption sharply rises, as indicated by an arrow A. This may lead to an increase in battery power consumption or to malfunction due to power consumption exceeding the battery capacity. However, even if the memory is in the busy state, the process of the controller progresses, and thus the process speed of the memory system is high.

Figure 3:
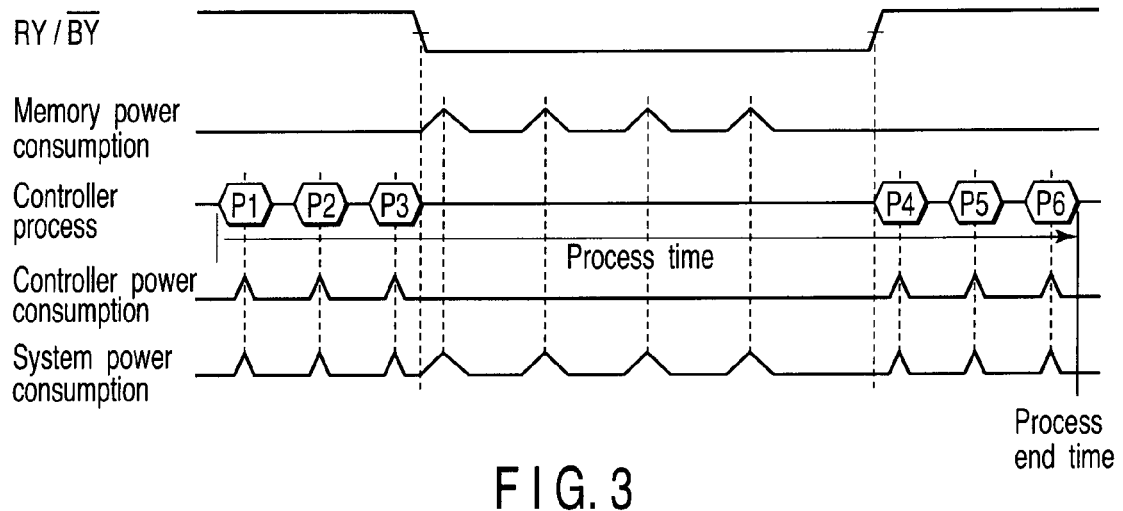
FIG. 3 is a timing chart showing another example of the relationship between the memory system operation and the power consumption in the typical example.

FIG. 3 is a timing chart showing another example of the relationship between the memory system operation and the power consumption in the typical example.

The ready/busy output RY//BY is provided in the memory system. It is thinkable that the process of the controller is halted while the memory is in the busy state, as shown in FIG. 2, by making use of the ready/busy output RY//BY. In the busy state, the process of the controller is halted. Thus, the peak of the memory power consumption does not overlap the peak of the controller power consumption. In this example, the peak of the system power consumption does not sharply rise. However, since the process of the controller is halted while the memory is in the busy state, the process speed of the memory system is low.

Figure 4:
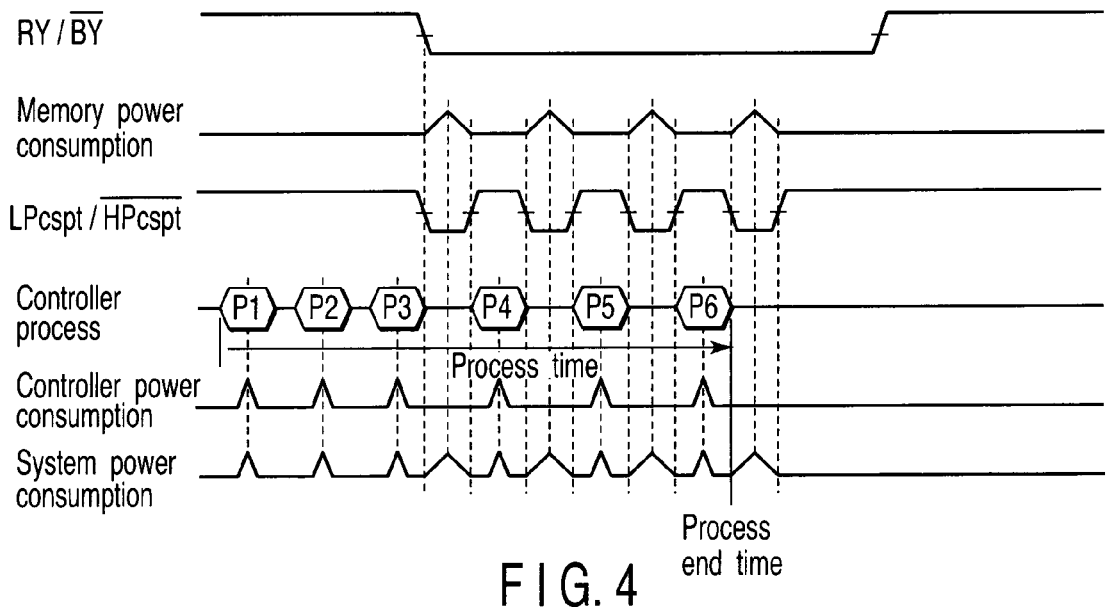
FIG. 4 is a timing chart showing an example of the relationship between a memory system operation and a power consumption in the first embodiment of the invention.

FIG. 4 is a timing chart showing an example of the relationship between the memory system operation and the power consumption in the first embodiment of the invention;

The memory system 1 of this example has a high-power-consumption operation output LPcspt//HPcspt, in addition to the ready/busy output RY//BY. As is indicated, when the output LPcspt//HPcspt in this example is at "H" level, the power consumption of the memory 3 is low (the high-power-consumption operation output is negated). On the other hand, when the output LPcspt//HPcspt is at "L" level, the power consumption of the memory 3 is high (the high-power-consumption operation output is asserted). In the memory system 1 of this example, the controller 2 progresses the process even while the memory 3 is in the busy state, but the controller 2 partly halts, or halts, the process while the output LPcspt// HPcspt is at "L" level, namely, while the high-power-consumption operation output is being asserted. In the example shown in FIG. 4, the process is halted for easier understanding of the embodiment. In this manner, the controller 2 partly halts, or halts the process while the power consumption of the memory 3 is high, thus operating in the low power consumption mode. While the power consumption of the memory 3 is low, the process is being progressed. Thereby, while the high process speed is being maintained, the peak of the high power consumption of the entire memory system 1 can be suppressed.

Next, specific examples of the memory system according to the first embodiment are described.

FIG. 5 is a block diagram showing a first example of the memory system according to the first embodiment of the invention.

As shown in FIG. 5, in the memory 3 that is included in the memory system 1 of the first example, the high-power-consumption operation output generating circuit 10 asserts or negates the high-power-consumption operation output on the basis of an output from a high voltage generating circuit 20. Further, in the controller 2 that is included in the memory system 1 of the first example, the operation mode switching signal generating circuit 11 stops oscillation of an internal clock of an internal oscillator (OSC) 21, or stops the supply of the internal clock, when the high-power-consumption operation output is asserted. The internal clock is used to determine the timing of the internal operation of the controller 2 itself. For example, the internal clock is supplied to a host interface (host I/F), a buffer, a CPU and a memory interface (memory I/F), and these circuit blocks operate on the basis of the internal clock. The process of the controller 2 itself may be halted by stopping the oscillation of the internal oscillator 21 itself or by stopping the supply of the internal clock without stopping the oscillation of the internal oscillator 21 itself. In addition, the process of the controller 2 itself may be partly halted by the supply of one or more of the internal clock to the host interface, the internal clock to the buffer, the internal clock to the CPU and the internal clock to the memory interface. Moreover, upon detecting transition from the asserted state to the negated state of the high-power-consumption operation output, the controller 2 resumes the oscillation of the internal clock or the supply of the internal clock, thus restoring from the low power consumption mode to the normal power consumption mode.

Besides, when the high-power-consumption operation output is asserted, the controller 2 may halt data transfer between the controller 2 and the memory. This can also set the controller 2 in the low power consumption mode. Upon detecting transition from the asserted state to the negated state of the high-power-consumption operation output, the controller 2 resumes the data transfer between the controller 2 and the memory, thus restoring from the low power consumption mode to the normal power consumption mode.

Next, an example of the specific operation of the memory 3, which is included in the memory system 1 of the first example, is described.

Figure 6:
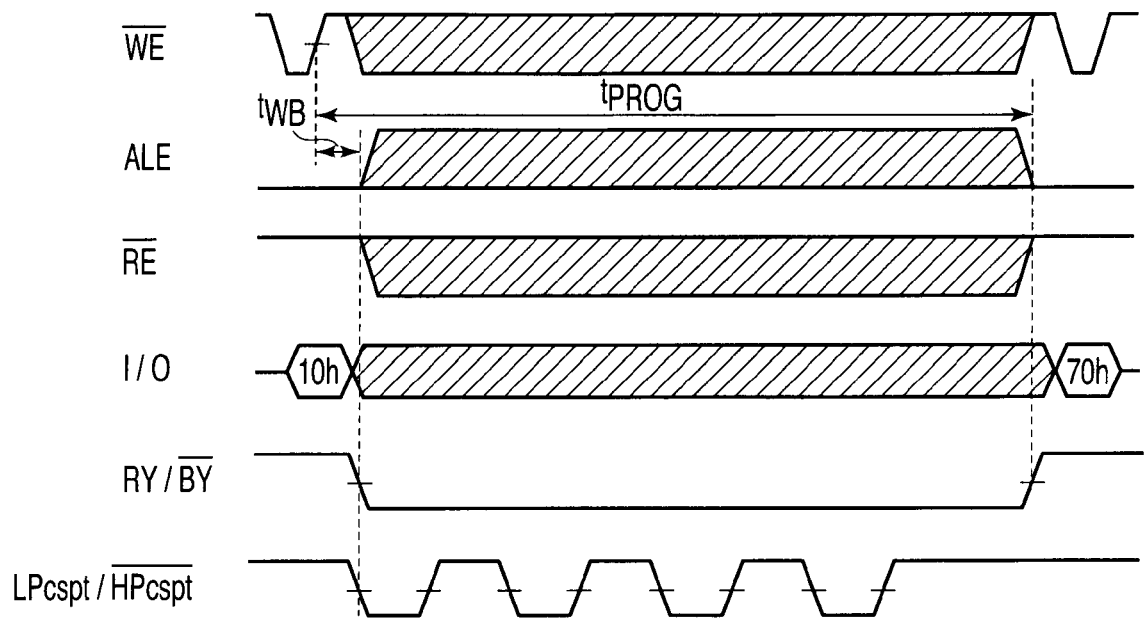
FIG. 6 is a waveform chart showing an example of the write operation of the memory system shown in FIG. 5.

FIG. 6 is a waveform chart showing an example of the write operation of the memory system shown in FIG. 5.

As an example of the specific operation, an auto page program, which is one of write operations, is described. Needless to say, aside from the write operation, an erase operation and a read operation can similarly be executed.

FIG. 6 illustrates an auto page program, which is one of write operations. The auto page program is started when a command 10h ("h" is a hexadecimal numeral) is input to the input/output pin I/O while the write enable /WE is at "L" level. Then, when a command 70h is input to the input/output pin I/O while the write enable /WE is at "L" level, status read is executed to read out a status which is indicative of "success" or "failure" of write.

During the auto page program, the ready/busy output is set at "L". During this time, the high-power-consumption operation output LPcspt//HPcspt repeats a level change between "H" and "L", which is based on the following control.

Figure 7:
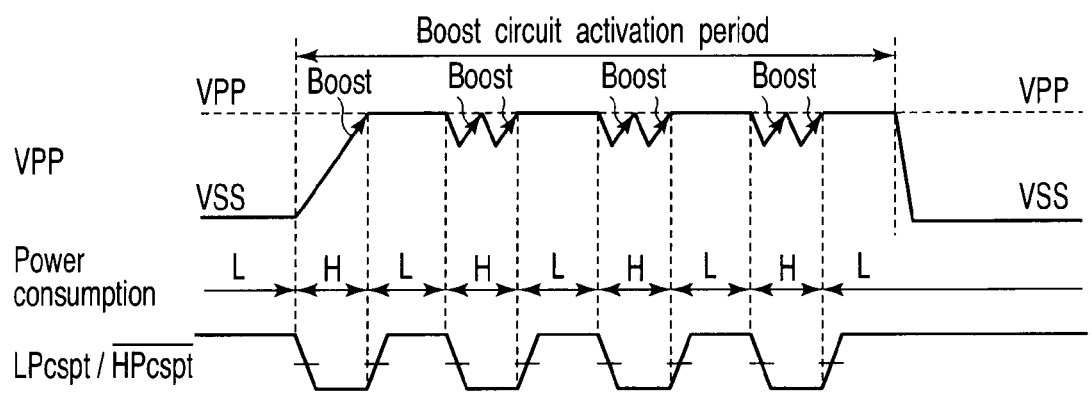
FIG. 7 is a waveform chart showing the relationship between a boost voltage VPP and an operation output LPcspt/HPcspt in the memory system shown in FIG. 5.

FIG. 7 is a waveform chart showing the relationship between a boost voltage VPP and the operation output LPcspt//HPcspt in the memory system shown in FIG. 5.

If the auto page program is started, the high voltage generating circuit 20 shown in FIG. 5 is activated to generate a boost voltage VPP. An example of the state in which the power consumption tends to easily increase is a state in which the high voltage generating circuit 20 is performing a boost operation ("H" is a period in which power consumption is high; "L" is a period in which power consumption is low). Although not particularly shown in this specification, an internal signal, which instructs the high voltage generating circuit 20 to perform the boost operation, is generated within the memory 3. This internal signal is received by the high-power-consumption operation output generating circuit 10 shown in FIG. 5, whereby the high-power-consumption operation output generating circuit 10 can set the operation output LPcspt//HPcspt at "L" level ("assert") during the boost operation. Further, in the auto page program, "write" and "verify" are repeated until the threshold of the cell reaches a predetermined level corresponding to write data that is input. In other words, precharge to the bit line and write pulse application to the word line are repeated. As described above, since these internal operations consume a great amount of electric current, the drop of the boost voltage VPP and the start of the boost operation are repeated each time the bit line is precharged and each time the write pulse is applied to the word line. At the time of the boost operation, too, the power consumption of the memory 3 increases, and thus the operation output LPcspt//HPcspt is set at "L" level.

By informing the outside of the memory 3 about the operation output LPcspt//HPcspt, the controller 2 can perform the operation as illustrated in FIG. 4.

An example of the structure of the memory 3 according to the first example is described below.

The memory 3 shown in FIG. 5 is a memory chip. The memory chip includes a memory cell array 101, a memory control circuit 102, a command decoder 103, an operation machine 104, an input/output circuit (I/O) 105, a data register 106, a high voltage generating circuit 20, and a high-power-consumption operation output generating circuit 10.

A plurality of memory cells are integrated in the memory cell array 101. An example of the memory cell is a nonvolatile semiconductor memory cell. An example of the nonvolatile semiconductor memory cell is a threshold-variable transistor, or a memory cell unit including a plurality of threshold-variable transistors. An example of the threshold-variable transistor is a transistor which includes a charge accumulation layer and has a threshold that is variable in accordance with the amount of charge, e.g. the amount of electrons, which is accumulated in the charge accumulation layer. An example of the memory cell unit is a NAND-type memory cell unit in which threshold-variable transistors are connected in series between a source line and a bit line. The memory cell array 101 is controlled by the memory cell control circuit 102.

The command decoder 103 decodes a command from the outside of the memory chip. The command is input to the command decoder 103 via the input/output circuit 105.

The operation machine 104 determines at least one operation in accordance with an output from the command decoder 103, and outputs a control signal which controls the memory control circuit 102 in accordance with the determined operation.

The data register 106 temporarily stores data (write data) from the outside of the memory chip. The write data is input to the data register 106 via the input/output circuit 105. In addition, the data register 106 temporarily stores data (read data) from the memory cell array 101. The read data is output to the outside of the memory chip via the input/output circuit 105.

The high voltage generating circuit 20 includes a boost circuit. An example of the boost circuit is a charge pump circuit. The high voltage generating circuit 20 including the boost circuit generates a boost voltage in accordance with a control signal from the memory control circuit 102. An example of the boost voltage is VPP.

The high-power-consumption operation output generating circuit 10 determines, on the basis of an internal signal from the high voltage generating circuit 20, whether the high voltage generating circuit 20 is performing the boost operation. Based on the determination result, the high-power-consumption operation output generating circuit 10 determines whether the high-power-consumption operation output is to be asserted or negated. For example, the high-power-consumption operation output generating circuit 10 asserts the high-power-consumption operation output while the high voltage generating circuit 20 is performing the boost operation, and negates the high-power-consumption operation output while the high voltage generating circuit 20 does not perform the boost operation.

Next, an example of the structure of the controller 2 according to the first example is described.

The controller 2 shown in FIG. 5 is a controller chip. The controller chip, as described above, has the interface function for interface between the host and the memory 3. As an example of the interface function, the controller chip manages the physical state in the memory 3 (e.g. which of numerically ordered logical sector address data is stored at which physical block address, or which block is in an erased state). The controller chip includes a host interface (host I/F) 201, a CPU (Central Processing Unit) 202, a memory interface (memory I/F) 203, a ROM (Read Only Memory) 204, a RAM (Random Access Memory) 205, an operation mode switching signal generating circuit 11 and an internal oscillator 21.

The host interface 201 executes an interface process between the host and the controller chip.

The CPU 202 controls the operation of the entire memory system 1. For example, when the memory system 1 is powered on, the CPU 202 reads out firmware (control program), which is stored in the ROM 204, into the RAM 205, and executes a predetermined process, thereby creating various tables in the RAM 205.

In addition, the CPU 202 receives a write command, a read command and an erase command from the host, and executes a predetermined process for the memory 3 or controls a data transfer process via the buffer 206.

The ROM 204 stores, for instance, the control program which is controlled by the CPU 202.

The RAM 205 is used as a working area of the CPU 202 and stores the control program and various tables.

The memory interface 203 executes an interface process between the controller chip and the memory 3.

The buffer 206 temporarily stores a predetermined amount of data (e.g. 1 page) when data that is sent from the host is to be written in the memory 3, and also temporarily stores a predetermined amount of data when data that is read out of the memory 3 is to be sent to the host.

The internal oscillator 21 oscillates an internal clock. The internal clock is supplied to, e.g. the host interface 201, CPU 202, memory interface 203 and buffer 206.

The operation mode switching signal generating circuit 11, as described above, generates the switching signal, which stops the oscillation of the internal clock of the internal oscillator 21 or stops the supply of the internal clock, when the high-power-consumption operation output is asserted.

Figure 8:
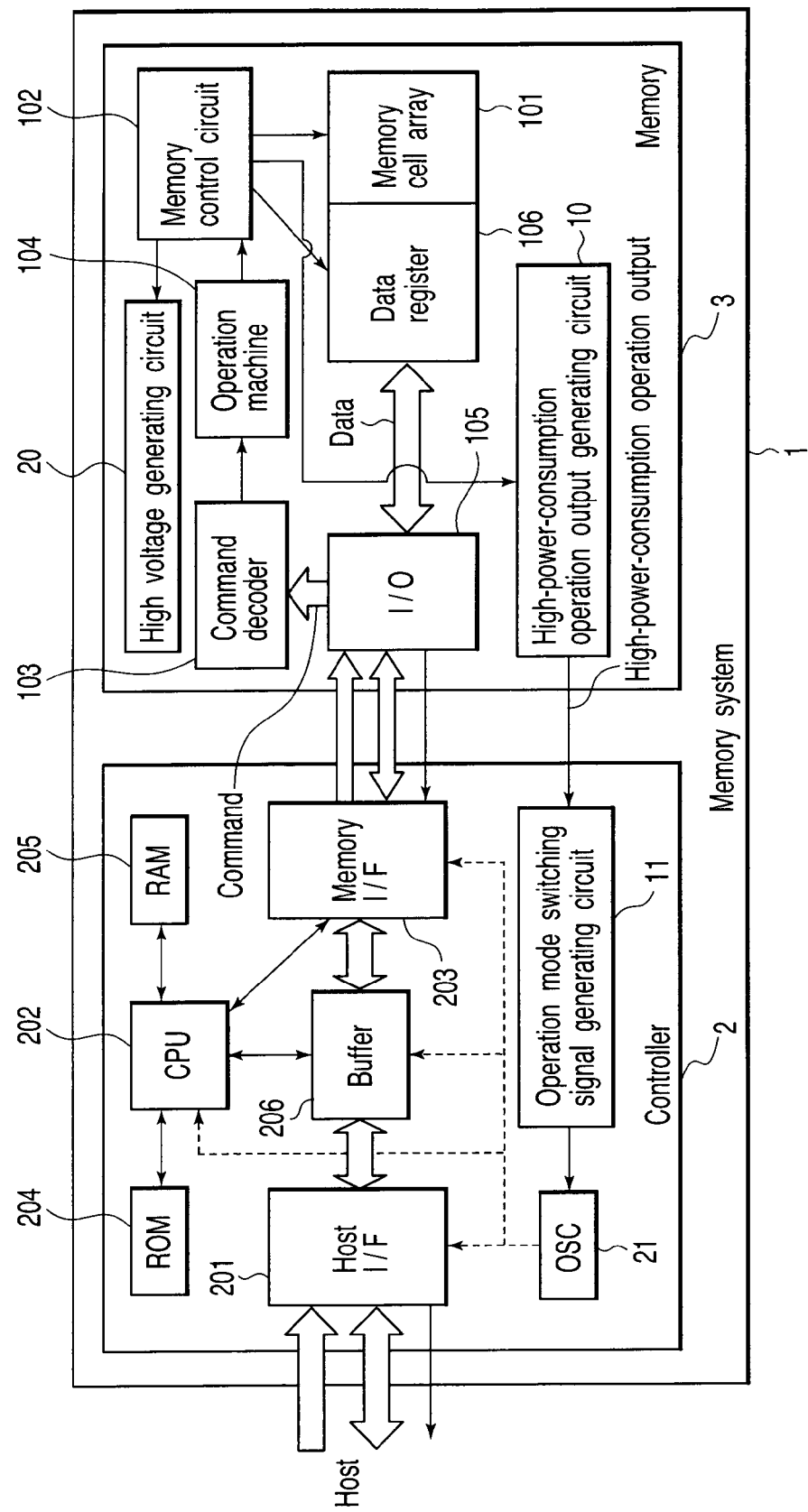
FIG. 8 is a block diagram showing a second example of the memory system according to the first embodiment of the invention.

FIG. 8 is a block diagram showing a second example of the memory system according to the first embodiment of the invention.

In the first example, the high-power-consumption operation output generating circuit 10 uses the internal signal, which instructs the boost operation of the high voltage generating circuit 20, in order to generate the operation output LPcspt//HPcspt. However, the generation of the operation output LPcspt//HPcspt is not limited to this example. For example, as shown in FIG. 8, the operation output LPcspt//HPcspt can be generated by making use of the internal signal of the memory control circuit 102. For example, as described above, a large amount of electric current is consumed at the time of precharging the bit line and applying the write pulse to the word line. The memory control circuit 102 generates an internal signal for precharging the bit line and an internal signal for applying the write pulse to the word line. For example, by making use of these internal signals, the operation output LPcspt//HPcspt, which has a waveform as shown in FIG. 7, can be generated.

Although not particularly shown, the high-power-consumption operation output generating circuit 10 may be configured to determine one of operations on the basis of the control signal from the operation machine 104, and to determine whether to assert or negate the high-power-consumption state output in accordance with the determined operation.

Similarly, although not shown, the high-power-consumption operation output generating circuit 10 may be configured to determine one of operations on the basis of the output from the command decoder 103, and to determine whether to assert or negate the high-power-consumption state output in accordance with the determined operation.

Second Embodiment

A second embodiment is an example relating to an output method of the high-power-consumption operation output.

FIG. 9 is a circuit diagram showing a first example of a memory system according to the second embodiment of the invention.

As shown in FIG. 9, the memory system 1 includes a high-power-consumption operation output line which transmits the high-power-consumption operation output from the memory 3 to the controller 2.

The memory 3 shown in FIG. 9 drives the high-power-consumption operation output line when the high-power-consumption operation output is asserted, and sets the power-consumption operation output line at a high impedance when the high-power-consumption operation output is negated, or vice versa. FIG. 9 shows the former by way of example.

Specifically, the output of the high-power-consumption operation output generating circuit 10 is supplied to the gate of an N-channel insulated-gate FET 30. The FET 30 drives the high-power-consumption operation output line when the output of the high-power-consumption operation output generating circuit 10 is at "H" level, and transitions the potential of the high-power-consumption operation output line in a direction to a ground potential Vss. On the other hand, the FET 30 is rendered off when the output of the high-power-consumption operation output generating circuit 10 is at "L" level, thus setting the high-power-consumption operation output line at a high impedance.

The high-power-consumption operation output line is led into the controller 2. The controller 2 includes a pull-up resistor 31 which is connected between the high-power-consumption operation output line and a power supply potential Vdd, and a P-channel insulated-gate FET 32 which has a gate connected to the high-power-consumption operation output line.

When the potential of the high-power-consumption operation output line has lowered in a direction to the ground potential Vss, the FET 32 is rendered conductive and raises the potential at a node 33. On the other hand, when the potential of the high-power-consumption operation output line has been increased by the pull-up resistor in a direction from the ground potential Vss to the power supply potential Vdd, the FET 32 is turned off and lowers the potential at the node 33. In accordance with the potential of the node 33, the operation mode switching signal generating circuit 11 enables or disables the switching signal.

The above-described method is advantageously applicable to a memory system having a plurality of memories 3.

Figure 10:
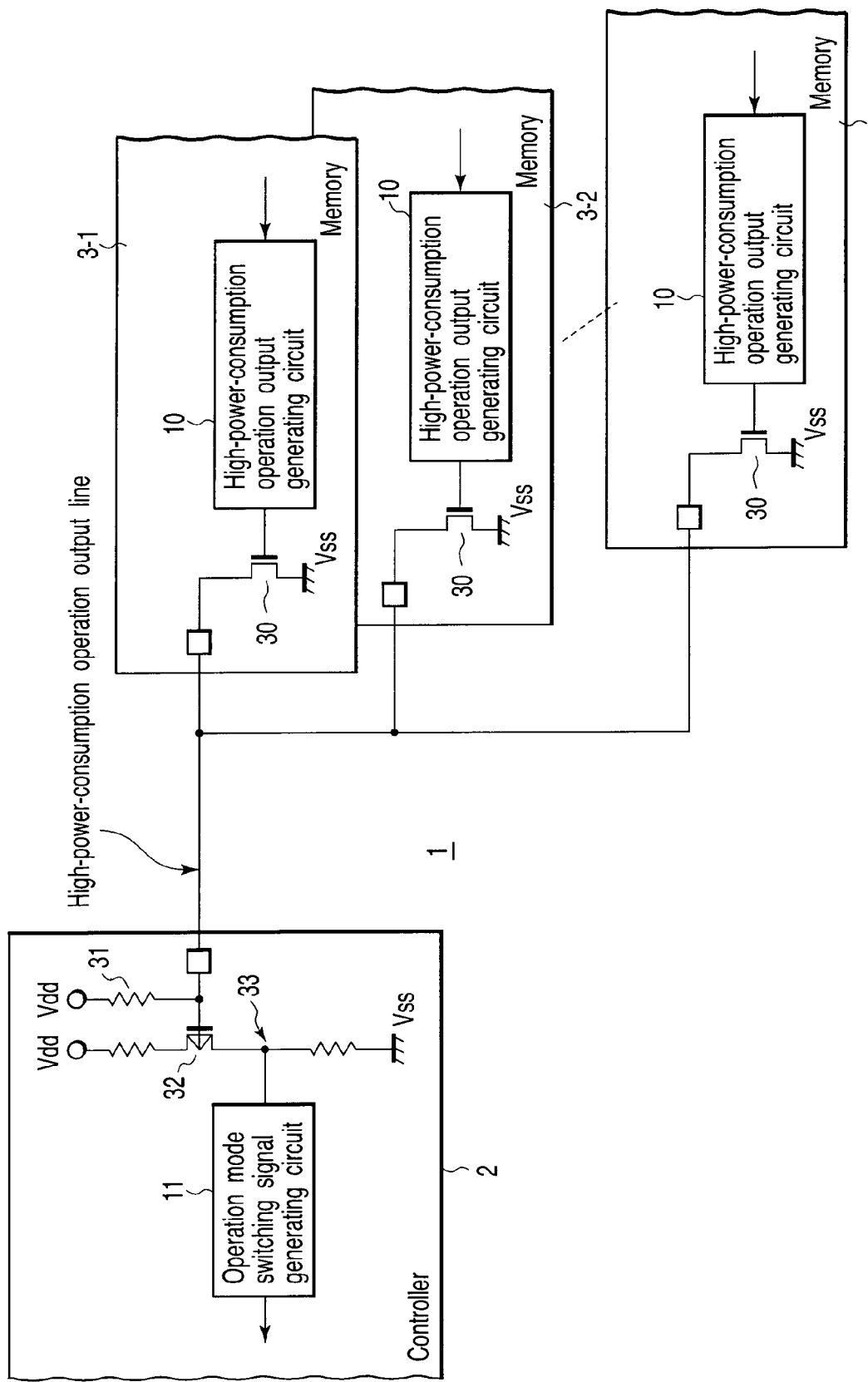
FIG. 10 shows an example of use of the memory system according to the second embodiment of the invention.

FIG. 10 shows an example of use of the memory system according to the second embodiment of the invention.

The memory system 1 shown in FIG. 10 includes an n-number of memories 3 (3-1 to 3-*n*). The memories 3-1 to 3-*n* include FETs 30, respectively. The FETs 30 are commonly connected to the high-power-consumption operation output line. When one of the FETs 30 is rendered conductive, the potential of the high-power-consumption operation output line decreases in a direction to the ground potential Vss. This connection is so-called "wired-OR connection".

The memory 3 drives the high-power-consumption operation output line when the high-power-consumption operation output is asserted, and sets the power-consumption operation output line at a high impedance when the high-power-consumption operation output is negated, or vice versa. Thereby, the high-power-consumption operation output of the plural memories 3 can be supplied to the controller 2 in a wired-OR connection fashion. Therefore, the memory system 1 according to the second embodiment is advantageously applicable to the memory system having a plurality of memories 3.

FIG. 11 is a circuit diagram showing a second example of the memory system according to the second embodiment of the invention.

As shown in FIG. 11, the pull-up resistor 31 may be provided not within the controller 2, but outside the controller 2. For example, the pull-up resistor 31 may be connected between the high-power-consumption operation output line, which extends between a power-consumption operation pin 34 of the memory 3 and a power-consumption operation pin 35 of the controller 2, and the power supply potential Vdd.

FIG. 12 is a block diagram showing a first example of connection of the memory system.

As shown in FIG. 12, in the first example of connection, the controller 2 and memory 3 are disposed on a circuit board 10 within the memory system 1, and the controller 2 and memory 3 are connected via wiring lines 41 formed on the circuit board 10. In this case, both the first example shown in FIG. 9 and the second example shown in FIG. 11 can be used. The reason why the second example shown in FIG. 11 can be used is that it should suffice if the pull-up resistor 31 is formed on the circuit board 10.

FIG. 13 is a block diagram showing a second example of connection of the memory system.

As shown in FIG. 13, in the second example of connection, the controller 2 is disposed on the memory 3, and the controller 2 and memory 3 are connected via bonding wires 42. In this case, too, both the first example shown in FIG. 9 and the second example shown in FIG. 11 can be used, but it is relatively difficult to use the second example. The reason is that it is difficult to connect the pull-up resistor 31 to the bonding wires 42. However, if the pull-up resistor 31 is provided on the controller 2, as in the first example, it should suffice to connect the controller 2 and memory 3, and thus the use is easy. From this standpoint, it is understood that the first example shown in FIG. 9 is advantageously applicable to the memory system 1, in which the controller 2 is disposed on the memory 3, in order to promote the reduction in size.

Third Embodiment

Figure 14:
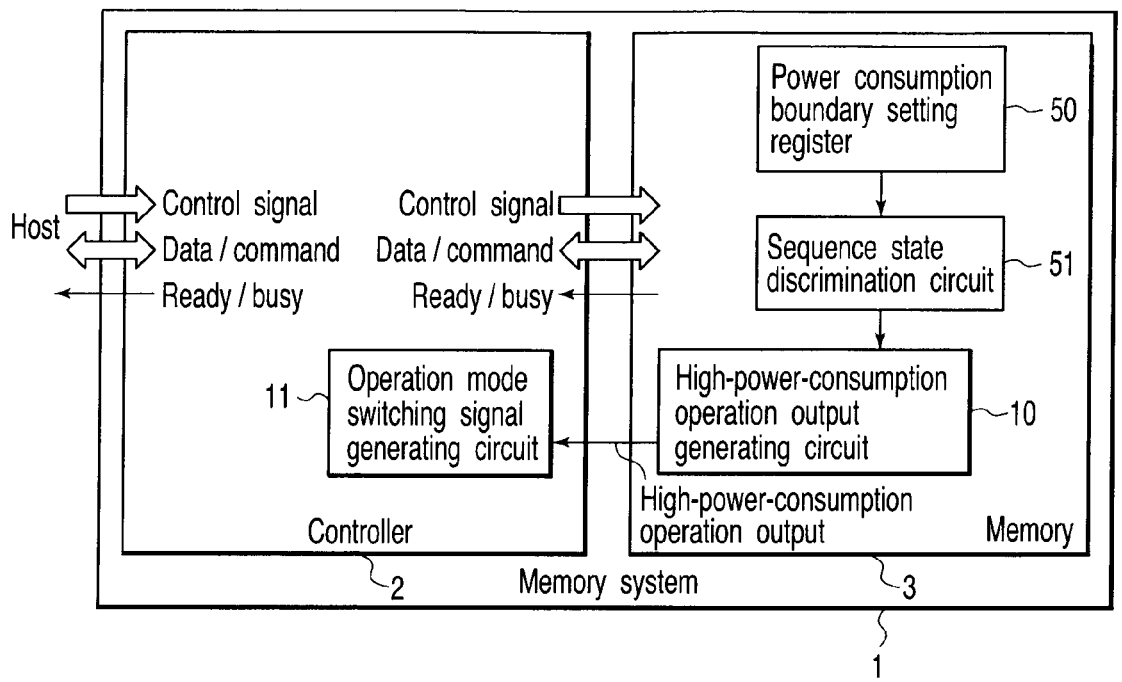
FIG. 14 is a block diagram showing an example of a memory system according to a third embodiment of the invention.

FIG. 14 is a block diagram showing an example of a memory system according to a third embodiment of the invention.

As shown in FIG. 14, in the third embodiment, the level of the high-power-consumption operation can be selectively set in the memory 3 by an instruction from the controller 2. Specifically, the level of the power consumption value for distinguishing "assert" and "negate" of the high-power-consumption operation output is set from the outside. The set level of the power consumption value is stored in a power consumption boundary setting register 50 of the memory 3. A sequence state discrimination circuit 51 discriminates the sequence state, and detects or estimates the value of the power consumption of the memory 3. The level, which is stored in the power consumption boundary setting register 50, is supplied to the sequence state discrimination circuit 51. The sequence state discrimination circuit 51, for example, compares the supplied level and the detected or estimated level of the power consumption of the memory 3. The comparison result is output to the high-power-consumption operation output generating circuit 10. Based on the output from the sequence state discrimination circuit 51, the high-power-consumption operation output generating circuit 10 sets the high-power-consumption operation output at "H" level or "L" level. In addition, the power consumption differs between the write, read and erase operations. Different levels corresponding to the respective operations may be stored in the power consumption boundary setting register 50, and the sequence state discrimination circuit 51 may be caused to produce an output for determining whether to set the high-power-consumption operation output at "H" level or "L" level, in accordance with the respective operations. Moreover, different levels corresponding to the modes of the memory system may be stored in the power consumption boundary setting register 50, and the sequence state discrimination circuit 51 may be caused to produce an output for determining whether to set the high-power-consumption operation output at "H" level or "L" level, in accordance with the respective modes.

According to the third embodiment, the level of the power consumption value for distinguishing "assert" and "negate" of the high-power-consumption operation output can be kept at a level not higher than a fixed, predetermined power consumption value that is set according to the needs of the memory system 1. Alternatively, a predetermined power consumption value, which has to be maintained and must not be exceeded, can be selected in accordance with the mode of the memory system that is set from the host side.

Fourth Embodiment

Figure 15:
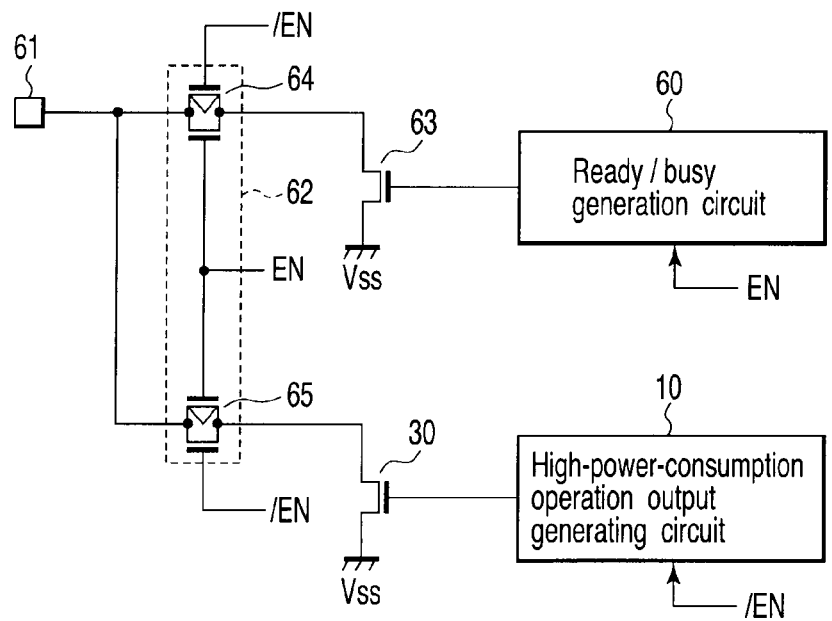
FIG. 15 is a circuit diagram showing a first example of an operation output generating circuit which is included in a memory chip according to a fourth embodiment of the invention.

FIG. 15 is a circuit diagram showing a first example of an operation output generating circuit which is included in a memory chip according to a fourth embodiment of the invention.

As shown in FIG. 15, the power consumption operation pin may be shared with a ready/busy pin 61.

The output of a ready/busy generation circuit 60 is connected to the gate of an N-channel insulated-gate FET 63. The FET 63 is connected in series between the pin 61 and the ground potential Vss via a switch circuit 62. A specific example of the switch circuit 62 is a CMOS transfer gate 64. The transfer gate 64 is connected between the pin 61 and the FET 63.

The output of the high-power-consumption operation output generating circuit 10 is connected to the gate of the FET 30. The FET 30 is connected in series between the pin 61 and the ground potential Vss via the switch circuit 62. A specific example of the switch circuit 62 is a CMOS transfer gate 65. The transfer gate 65 is connected between the pin 61 and the FET 63.

The ready/busy generation circuit 60 in this example is activated when an enable signal EN is at "H" level, and is de-activated when the enable signal EN is at "L" level. The high-power-consumption operation output generating circuit 10 in this example is activated when a signal /EN that is an inverted signal of the enable signal EN is at "H" level, and is de-activated when the signal /EN is at "L" level.

Figure 16:
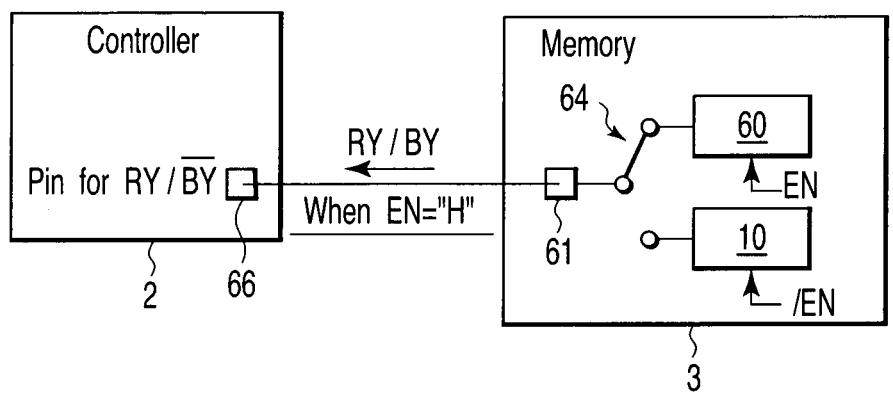
FIG. 16 shows a first example of the structure of a memory system which makes use of the memory chip shown in FIG. 15.

Thus, as shown in FIG. 16, when the signal EN is at "H" level, the ready/busy generation circuit 60 is activated and the high-power-consumption operation output generating circuit 10 is de-activated. The transfer gate 64 shown in FIG. 15 is rendered conductive, and the transfer gate 65 is rendered non-conductive. Hence, the FET 30 is disconnected from the pin 61, and the FET 63 is connected to the pin 61.

In this case, the memory 3 according to the first example of the fourth embodiment is usable when the controller 2 supports only a ready/busy pin 66.

Figure 17:
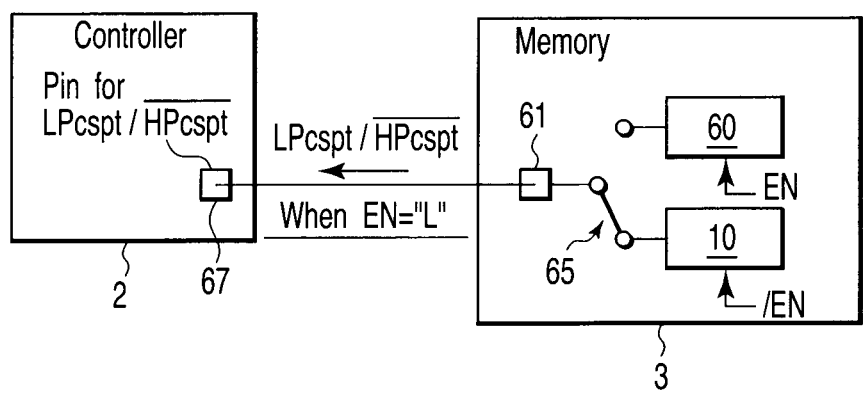
FIG. 17 shows a second example of the structure of the memory system which makes use of the memory chip shown in FIG. 15.

Conversely, as shown in FIG. 17, when the signal EN is at "L" level, the high-power-consumption operation output generating circuit 10 is activated and the ready/busy generation circuit 60 is de-activated. The transfer gate 65 shown in FIG. 15 is rendered conductive, and the transfer gate 64 is rendered non-conductive. Hence, the FET 30 is connected to the pin 61.

In this case, the memory 3 according to the first example of the fourth embodiment is usable when the controller 2 supports only a power consumption operation pin 67.

Figure 18:
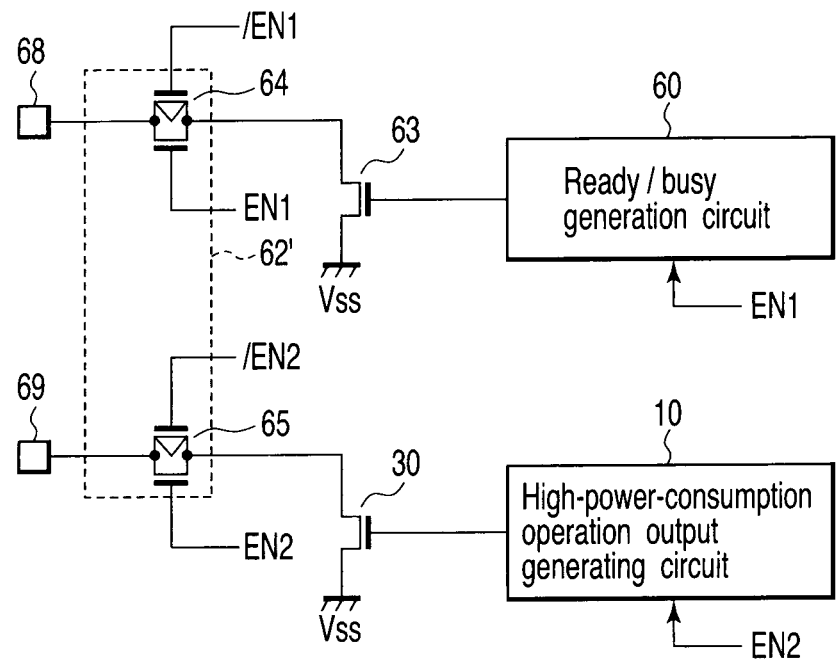
FIG. 18 is a circuit diagram showing a second example of the operation output generating circuit which is included in the memory chip according to the fourth embodiment of the invention.

FIG. 18 is a circuit diagram showing a second example of the operation output generating circuit which is included in the memory chip according to the fourth embodiment of the invention.

In the second example, both a ready/busy pin 68 and a power consumption operation pin 69 are provided, and only one of them, or both of them, can be used.

As shown in FIG. 18, the second example differs from the first example with respect to a switch circuit 62'. The switch circuit 62' includes switches 64, 65 and 70. The switch 64 is connected between the pin 68 and the FET 63. The switch 65 is connected between the pin 69 and the FET 30. The switch 70 is connected between the pin 68 and pin 69.

The ready/busy generation circuit 60 is activated when an enable signal EN1 is at "H" level.

The high-power-consumption operation output generating circuit 10 is activated when an enable signal EN2 is at "H" level.

Figure 19:
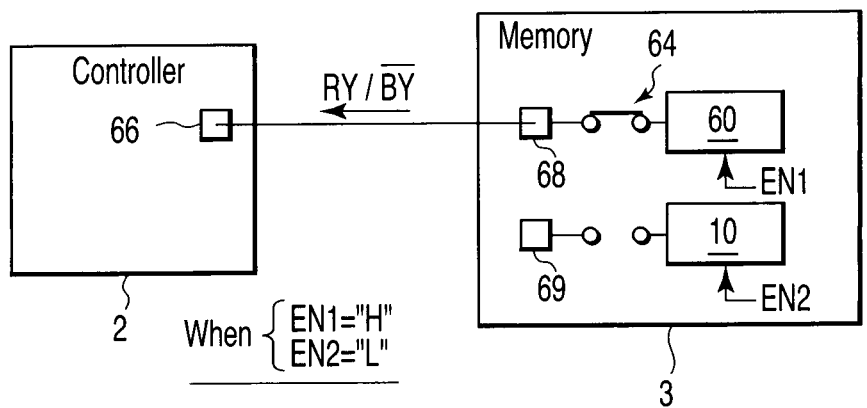
FIG. 19 shows a first example of the structure of a memory system which makes use of the memory chip shown in FIG. 18.

As shown in FIG. 19, when the signal EN1 is at "H" level and the signal EN2 is at "L" level, the ready/busy generation circuit 60 is activated and the high-power-consumption operation output generating circuit 10 is de-activated. The transfer gate 64 shown in FIG. 18 is rendered conductive, and the transfer gate 65 is rendered non-conductive. Thus, the FET 63 is connected to the pin 68.

In this case, the memory 3 according to the second example of the fourth embodiment is usable when the controller 2 supports only the ready/busy pin 66.

Figure 20:
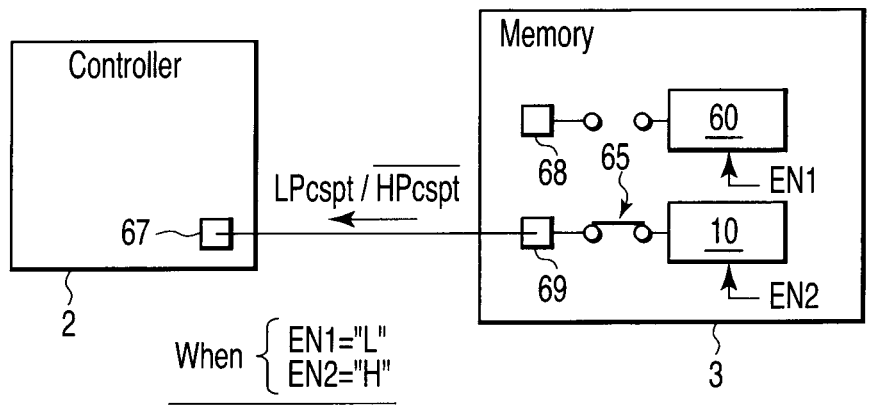
FIG. 20 shows a second example of the structure of the memory system which makes use of the memory chip shown in FIG. 18.

As shown in FIG. 20, when the signal EN1 is at "L" level and the signal EN2 is at "H" level, the high-power-consumption operation output generating circuit 10 is activated and the ready/busy generation circuit 60 is de-activated. The transfer gate 65 shown in FIG. 18 is rendered conductive, and the transfer gate 64 is rendered non-conductive. Thus, the FET 30 is connected to the pin 69.

In this case, the memory 3 according to the second example of the fourth embodiment is usable when the controller 2 supports only the power consumption operation pin 67.

Figure 21:
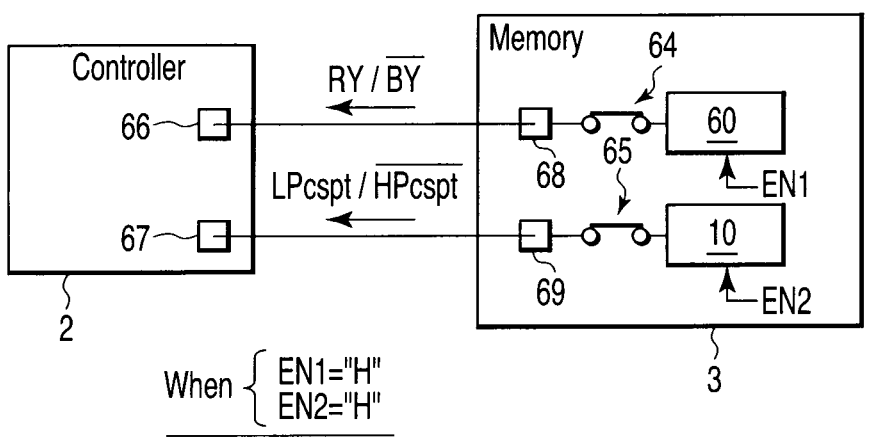
FIG. 21 shows a third example of the structure of the memory system which makes use of the memory chip shown in FIG. 18.

As shown in FIG. 21, when both the signal EN1 and the signal EN2 are at "H" level, both the high-power-consumption operation output generating circuit 10 and the ready/busy generation circuit 60 are activated. Since both the transfer gates 64 and 65 shown in FIG. 18 are rendered conductive, the FET 63 is connected to the pin 68 and the FET 30 is connected to the pin 69.

In this case, the memory 3 according to the second example of the fourth embodiment is usable when the controller 2 supports both the ready/busy pin 66 and the power consumption operation pin 67.

The above-described embodiments include the following aspects:

(1) A memory system comprising: a memory which executes operations of write, read and erase, has different power consumptions in accordance with internal operations in the respective operations, and asserts a high-power-consumption operation output when an amount of the power consumption is high in the internal operations in the respective operations; and a controller which has an interface function between a host and the memory and receives the high-power-consumption operation output, the controller switching an operation mode thereof to a low power consumption mode when the high-power-consumption operation output is asserted.

(2) The memory system according to (1), wherein the controller halts data transfer with the memory at a time of the low power consumption mode.

(3) The memory system according to (1), wherein the controller stops supply of an internal clock, which is used to determine a timing of the internal operation of the controller itself, at a time of the low power consumption mode.

(4) The memory system according to (2), wherein the controller includes an operation mode switching signal generating circuit which generates a switching signal for switching the operation mode of the controller in accordance with the high-power-consumption operation output, and the memory interface circuit, and the switching signal is supplied to the memory interface circuit, and the memory interface circuit halts the data transfer with the memory when the switching signal has asserted the low power consumption mode.

(5) The memory system according to (3), wherein the controller includes an operation mode switching signal generating circuit which generates a switching signal for switching the operation mode of the controller in accordance with the high-power-consumption operation output, and an internal clock oscillation circuit which oscillates the internal clock, and the switching signal is supplied to the internal oscillation circuit, and the internal oscillation circuit halts oscillation of the internal clock when the switching signal has asserted the low power consumption mode.

(6) The memory system according to (1), further comprising a high-power-consumption operation output line which transmits the high-power-consumption operation output from the memory to the controller, wherein the memory drives the high-power-consumption operation output line when the high-power-consumption operation output is asserted, and sets the high-power-consumption operation output line at a high impedance when the high-power-consumption operation output is negated, or vice versa.

(7) The memory system according to (6), wherein the controller includes a switching signal generating circuit which generates a switching signal for switching the operation mode of the controller in accordance with the high-power-consumption operation output, and the switching signal generating circuit includes a resistor which is connected between a supply point, to which the high-power-consumption operation output is supplied, and a power supply, and the switching signal generating circuit generates the switching signal in accordance with a potential of a connection node between the resistor and the supply point.

(8) The memory system according to (6), further comprising a resistor which is connected between the high-power-consumption operation output line and a power supply.

(9) The memory system according to any one of (1) to (8), wherein the memory is a nonvolatile semiconductor memory.

(10) The memory system according to (9), wherein the nonvolatile semiconductor memory is a NAND flash memory.

(11) A memory chip which executes operations of write, read and erase, and has different power consumptions in accordance with internal operations in the respective operations, wherein the memory chip asserts a high-power-consumption operation output when an amount of the power consumption is high in the internal operations in the respective operations.

(12) The memory chip according to (11), further comprising a high-power-consumption operation output generating circuit which generates the high-power-consumption operation output, and an external output terminal which outputs the high-power-consumption operation output to outside, wherein the high-power-consumption operation output generating circuit drives the external output terminal when the high-power-consumption operation output is asserted, and sets the external output terminal at a high impedance when the high-power-consumption operation output is negated, or vice versa.

(13) The memory chip according to (11), wherein in the memory chip, a level of a power consumption value which discriminates assertion and negation of the high-power-consumption operation output is set from outside.

(14) The memory chip according to (13), further comprising a power consumption boundary setting register which stores the level of the power consumption value.

(15) The memory chip according to (11), wherein the memory chip comprises: a memory cell array in which a plurality of memory cells are integrated; a memory control circuit which controls the memory cell array; a command decoder which decodes a command from outside; an operation machine which determines the plural or single operation in accordance with an output from the command decoder, and outputs a control signal to control the memory control circuit in accordance with the determined operation; and a high-power-consumption operation output generating circuit which determines one of the plural or single operation, on the basis of the control signal from the operation machine, and determines whether to assert or negate the high-power-consumption operation output in accordance with the internal operation in the determined operation.

(16) The memory chip according to (11), wherein the memory chip comprises: a memory cell array in which a plurality of memory cells are integrated; a memory control circuit which controls the memory cell array; a command decoder which decodes a command from outside; an operation machine which determines the plural or single operation in accordance with an output from the command decoder, and outputs a control signal to control the memory control circuit in accordance with the determined operation; and a high-power-consumption operation output generating circuit which determines one of the plural or single operation, on the basis of the output from the command decoder, and determines whether to assert or negate the high-power-consumption operation output in accordance with the internal operation in the determined operation.

(17) The memory chip according to (11), wherein the memory chip comprises: a memory cell array in which a plurality of memory cells are integrated; a memory control circuit which controls the memory cell array; a command decoder which decodes a command from outside; an operation machine which determines the plural or single operation in accordance with an output from the command decoder, and outputs a control signal to control the memory control circuit in accordance with the determined operation; a high voltage generating circuit which generates a high voltage; and a high-power-consumption operation output generating circuit which determines, on the basis of an internal signal from the high voltage generating circuit, whether the high voltage generating circuit is generating the high voltage, and determines whether to assert or negate the high-power-consumption operation output in accordance with the determined operation.

(18) The memory chip according to (11), wherein the memory chip comprises: a memory cell array in which a plurality of memory cells are integrated; a memory control circuit which controls the memory cell array; a command decoder which decodes a command from outside; an operation machine which determines the plural or single operation in accordance with an output from the command decoder, and outputs a control signal to control the memory control circuit in accordance with the determined operation; and a high-power-consumption operation output generating circuit which determines one of the plural or single operation, on the basis of an internal signal from the memory control circuit, and determines whether to assert or negate the high-power-consumption operation output in accordance with the internal operation in the determined operation.

(19) The memory chip according to any one of (11) to (18), wherein the memory chip is a nonvolatile semiconductor memory chip.

(20) The memory chip according to (19), wherein the nonvolatile semiconductor memory chip is a NAND flash memory chip.

(21) The memory chip according to (11), wherein a pin of the high-power-consumption operation output is shared with a ready/busy pin, and one of the high-power-consumption operation output and a ready/busy is selected and output from the shared pin.

(22) The memory chip according to (11), wherein the memory chip comprises: a first pin to which the high-power-consumption operation output is supplied; and a second pin to which a ready/busy output is supplied, wherein the first and second pins output one of, or both of, the high-power-consumption operation output and the ready/busy output.

The present invention has been described by referring to some embodiments. The present invention is not limited to the above-described embodiments. At the stage of practicing the invention, various modifications may be made without departing from the spirit of the invention.

Although the respective embodiments can be practiced independently, the embodiments may properly be combined and practiced.

The embodiments include inventions in various stages, and inventions in various stages can be derived from proper combinations of structural elements disclosed herein.

In the embodiments, the invention has been described on the basis of the examples in which the invention is applied to the memory system. The invention, however, is not limited to the memory system. A semiconductor integrated circuit device incorporating this memory system, for example, a processor or a system LSI, is also within the scope of the invention.

The NAND flash memory has been described as an example of the nonvolatile semiconductor memory. The nonvolatile semiconductor memory, however, is not limited to the NAND flash memory, and it may be a flash memory other than the NAND flash memory, such as an AND flash memory or a NOR flash memory.

What is claimed is:

1. A memory system comprising:
a memory chip which has a high power consumption operation mode and a low power consumption operation mode in accordance with internal operation of the memory chip, wherein power consumption of the memory chip is lower in the low power consumption operation mode than in the high power consumption operation mode, and the memory chip asserts a high-power-consumption operation output when the memory chip is in the high power consumption operation mode which indicates the memory chip is in the high power consumption operation mode; and
a controller chip which is communicatively coupled to the memory chip, and which has an interface function between a host and the memory chip and receives the high-power-consumption operation output, the controller chip switching an operation mode thereof from a high power consumption mode to a low power consumption mode in response to receiving the high-power-consumption operation output from the memory chip, the power consumption of the controller chip being lower in the low power consumption mode than in the high power consumption mode,
wherein the controller chip includes an operation mode switching signal generating circuit which generates a switching signal for switching the operation mode of the controller chip in accordance with the high-power-consumption operation output, and a memory chip interface circuit, and
the switching signal is supplied to the memory chip interface circuit, and the memory chip interface circuit halts data transfer with the memory chip when the switching signal has asserted the low power consumption mode.

2. The system according to claim 1, wherein the controller chip stops supply of an internal clock, which is used to determine a timing of the internal operation of the controller chip itself, at a time of the low power consumption mode.

3. The system according to claim 2, wherein the controller chip further includes an internal clock oscillation circuit which oscillates the internal clock, and
the switching signal is supplied to the internal oscillation circuit, and the internal oscillation circuit halts oscillation of the internal clock when the switching signal has asserted the low power consumption mode.

4. The system according to claim 1, wherein the memory chip drives the high-power-consumption operation output line when the high-power-consumption operation output is asserted, and sets the high-power-consumption operation output line at a high impedance when the high-power-consumption operation output is negated, or vice versa.

5. The system according to claim 4, wherein the switching signal generating circuit includes a resistor which is connected between a supply point, to which the high-power-consumption operation output is supplied, and a power supply, and the switching signal generating circuit generates the switching signal in accordance with a potential of a connection node between the resistor and the supply point.

6. The system according to claim 4, further comprising a resistor which is connected between the high-power-consumption operation output line and a power supply.

7. A memory chip communicatively coupled to a controller chip comprising:
an input/output circuit communicatively coupled to the controller chip;
a memory cell array comprising a plurality of memory cells, the memory cell array configured to store data received by the input/output circuit from the controller chip;
a control circuit configured to control the memory cell array to execute operations of the memory chip; and
a high-power-consumption operation output generating circuit configured to output a high-power-consumption operation output to the controller chip via the input/output circuit, wherein
the high-power-consumption operation output generating circuit asserts a high-power-consumption operation output when an amount of the power consumption is high in internal operations of the memory chip,
the assertion of the high-power-consumption operation output corresponds to the amount of the power consumed by the internal operations,
the controller chip transitions from a high power consumption mode to a low power consumption mode in response to the assertion of the high-power-consumption operation output, and
the power consumption of the controller chip is lower in the low power consumption mode than in the high power consumption mode,
wherein the memory chip further comprises:
a command decoder which decodes a command from the controller chip; and
an operation machine which determines plural or single operation in accordance with an output from the command decoder, and outputs a control signal to control a memory control circuit in accordance with the determined operation, wherein
the high-power-consumption operation output generating circuit determines one of the plural or single operation, on the basis of the control signal from the operation machine, and determines whether to assert or negate the high-power-consumption operation output in accordance with the internal operation in the determined operation.

8. The memory chip according to claim 7, wherein in the memory chip, a level of a power consumption value which discriminates assertion and negation of the high-power-consumption operation output is set from the controller chip.

9. The memory chip according to claim 8, further comprising a power consumption boundary setting register which stores the level of the power consumption value.

10. The memory chip according to claim 7, wherein a pin of the high-power-consumption operation output is shared with a ready/busy pin, and one of the high-power-consumption operation output and a ready/busy is selected and output from the shared pin.

11. The memory chip according to claim 7, wherein the memory chip comprises:
 a first pin to which the high-power-consumption operation output is supplied; and
 a second pin to which a ready/busy output is supplied,
 wherein the first and second pins output one of, or both of, the high-power-consumption operation output and the ready/busy output.

12. The memory chip according to claim 7, wherein the memory chip is a nonvolatile semiconductor memory chip.

13. The memory chip according to claim 12, wherein the nonvolatile semiconductor memory chip is a NAND flash memory chip.

* * * * *